United States Patent
Murayama

[11] Patent Number: 5,858,425
[45] Date of Patent: Jan. 12, 1999

[54] PROCESS FOR PRODUCING A COMPOSITE GARLIC-EGG YOLK FOOD

[75] Inventor: Osamu Murayama, Kawaguchi, Japan

[73] Assignee: Sun Project Co., Ltd., Kumamotoshi, Japan

[21] Appl. No.: 869,205

[22] Filed: Jun. 4, 1997

[30] Foreign Application Priority Data

Nov. 10, 1996 [JP] Japan ..................... 8-289097

[51] Int. Cl.$^6$ .............. A23B 4/00; A23B 17/10; A23L 1/32; A21D 6/00
[52] U.S. Cl. .............. 426/89; 426/614; 426/92; 426/573; 426/240
[58] Field of Search ................ 426/89, 92, 614, 426/573, 638, 650, 240

[56] References Cited

U.S. PATENT DOCUMENTS 5,002,803  3/1991  Tsuchida et al. .

FOREIGN PATENT DOCUMENTS

| 56-106572 | 8/1981 | Japan . |
| 58-141382 | 8/1983 | Japan . |
| 59-151754 | 7/1984 | Japan . |
| 7-16085   | 1/1995 | Japan . |

OTHER PUBLICATIONS

Patent Abstracts of Japan, ABS GRP No. C56 ABS vol. No. 10 No. 182. Published Jun. 5, 1986 for Japan 61–28361 Inventor: Nakamura.

Patent Abstracts of Japan. Published Jan. 20, 1995 for Japan 07–16085 inventor: Ishida.

Patent Abstracts of Japan. ABS Grp No. C079. ABS vol. 5, No. 180 Published Nov. 19, 1981 for Japan 56–106572 Inventor: Hakamata.

Database Abstract. Dialog File 347: JAPIO for Japan 60–034151 published Feb. 21, 1985 inventor: Kyukichi.

Article from journal entitled "Wakasa (Youthfulness)" authored by Katsuji Nagai published Apr. 1, 1996, pp. 148 and 149, by Wakasa Publishing Co. (Tokyo, Japan) and translation thereof.

Primary Examiner—Anthony J. Weier
Attorney, Agent, or Firm—Fay, Sharpe, Beall, Fagan, Minnich & McKee

[57] ABSTRACT

A process for producing a garlic-egg yolk composite food include the step and stirring raw garlic to prepare a garlic paste, admixing the garlic paste with egg yolk to form a garlic-egg yolk composite in a gelled condition, heat-treating the gelled garlic-egg yolk composite, and powdering or granulating the heat-treated garlic-egg yolk composite. The step of admixing the garlic paste with egg yolk to form a garlic-egg yolk composite is carried out in such a manner that the temperature following the admixing of the garlic paste with the egg yolk is at least 40° C. Preferably, the raw garlic is steam-treated in advance, the heat-treatment is carried out by irradiating the gelled garlic-egg yolk composite with far-infrared rays. The step of powdering the heat-treated garlic-egg yolk composite is carried out with hard alumina rollers.

18 Claims, 2 Drawing Sheets

FIG. 2A
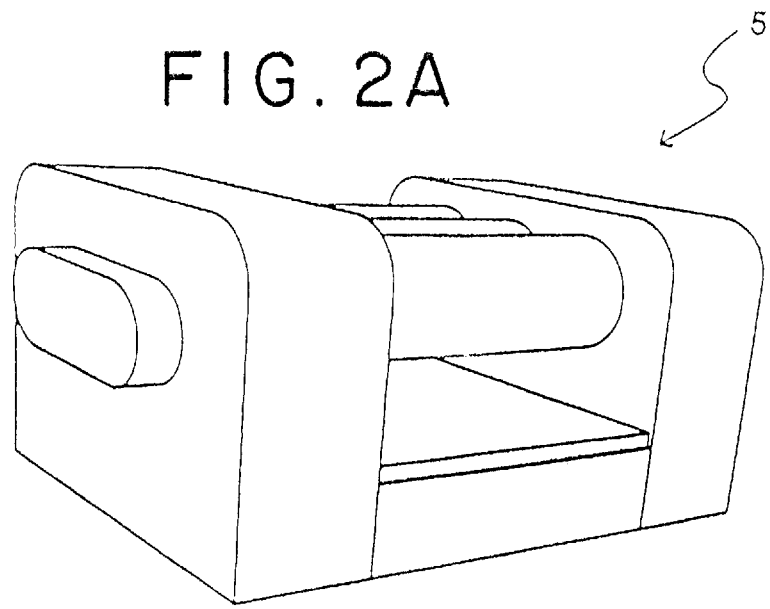
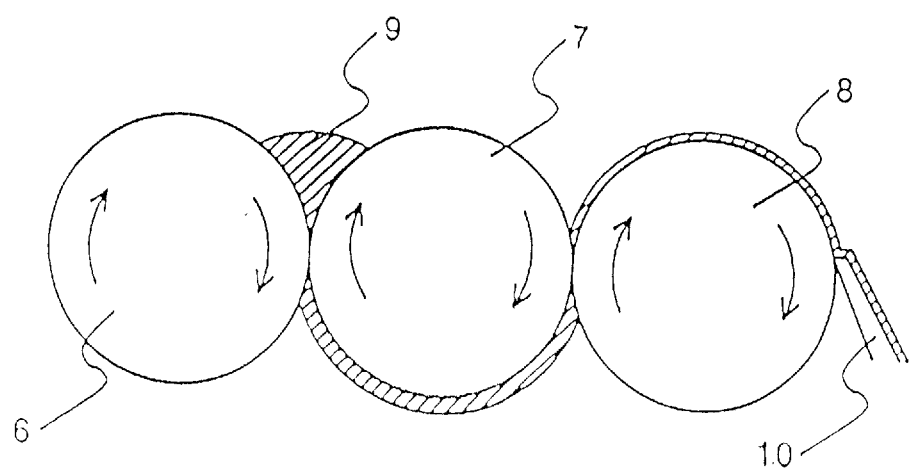
FIG. 2B

PROCESS FOR PRODUCING A COMPOSITE GARLIC-EGG YOLK FOOD

FIELD OF THE INVENTION

The present invention relates to a composite food comprised of garlic and egg yolk, and particularly to a novel process for producing such food on a large commercial scale.

BACKGROUND OF THE INVENTION

Based on practical experience, both garlic and eggs (particularly chicken eggs) have been valued as excellent, nutritious food materials from ancient times. More recently, science has thrown light upon their composition and efficacy.

It was found around the middle of this century that the peculiar smell of garlic derives from allysine. Studies made since this discovery show that allysine is predominantly responsible for a variety of the efficacies of garlic. For example, allysine combines with vitamin $B_1$ to form allithiamin, an activity-persistent vitamin, which functions in a similar manner to vitamin $B_1$ and is efficiently absorbed and stored in the body to accelerate the intake of vitamin $B_1$. It has also been reported that allysine functions to promote the secretion of acetylcholine, providing a tonic effect. Furthermore, it has been found that allysine has germ-killing or antibacterial effects and also that it combines with lipids to develop vasocleaning and hematogenous effects like vitamin E.

As to eggs, a French chemist successfully isolated phosphatidyl-choline, generally known as lecithin, from chicken egg yolk, around the middle of 19th century. Recent studies have reported that lecithin serves to improve and strengthen the brain activity. It has also been found that lecithin functions to remove LDL (low density lipoproteins: the so-called bad cholesterol) adhering to the walls of the arteries, helping to restore normal blood flow.

Thus, modern science has confirmed the efficacious effects of garlic and chicken egg yolk as nutritious foods. However, they are separately eaten in most cases and no composite foods comprised of garlic and chicken egg yolk was available. It is said that, in the southern part of Kyushu Island in Japan, a certain food made of a mixture of garlic and chicken egg yolk was produced as a food for home consumption in the feudal ages. However, the manufacture thereof was kept secret and no information was available.

Recently, interest in foods combining garlic and chicken egg yolk has increased in Japan and studies are being made regarding their preparation. Thus, a certain type of such foods is found to have been introduced in a magazine for housewives as a nutritious food which can easily be prepared at home. Besides, some such foods have been marketed commercially. The present inventor has also made an independent study to elucidate the process for preparing a composite food primarily comprised of garlic and chicken egg yolk based on the traditional technique.

The process for preparing such composite garlic-chicken egg yolk food generally includes the steps of heating and stirring garlic as a starting material to prepare a paste of garlic, mixing the paste with chicken egg yolk, and heat-treating the resultant mixture, followed by, when necessary, processing the heat-treated mixture into the form of powder or granules.

When preparing the food on a small scale at home, such steps can easily be carried out without any special contrivance or device. Even if some failure should occur and a poor product is obtained, there will be no serious problems. However, the present inventor has noticed that the simple practice of the above-mentioned steps will not produce the desired product in producing the composite food of garlic and chicken egg on a commercial scale. Several technical barriers must be overcome for production of a commercial product.

For example, for obtaining a product of high-quality substantially free of garlic smell, simple physical mixing of garlic with chicken egg yolk is not satisfactory but a sufficient chemical reaction must take place between the two components so as to form a composite product. In addition, in mass production on a commercial scale it will be necessary to reduce the repugnant garlic smell as much as possible in order to ensure for a comfortable working environment for the operators.

While the heat-treatment of a garlic-egg yolk mixture is the most important step, an ordinary heat-treatment may result in a high degree of carbonization of the mixture due to overbaking and thus the diminishment or complete loss of the efficacious ingredients, i.e. allysine and lecithine.

It should be further noted that such composite food is generally marketed in the form of a capsule with a soft capsulating material and therefore a device must be made so as to charge as much food material as possible in a unit capsule for a highly efficacious commercial food product.

It is therefore the primary object of the present invention to overcome the above-mentioned technical issues and provide a process for producing, on a mass scale, a composite food comprised of garlic and egg yolk with a high quality acceptable as a commercial food product.

While the term "egg yolk" generally refers to chicken egg yolk, it will be understood that the principle of present invention can be applied to any composite food comprised of garlic and egg yolk of other fowl such as geese or turkeys or of turtles. The term "egg yolk" as termed here includes the egg yolk of such animals.

DESCRIPTION OF THE INVENTION

The present invention is directed to a process for producing a garlic-egg yolk composite food which comprises heating and stirring raw garlic to prepare a garlic paste, admixing the garlic paste with egg yolk to form a garlic-egg yolk composite in a gelled condition, heat-treating the gelled garlic-egg yolk composite, and powdering or granulating the heat-treated garlic-egg yolk composite. The present invention is firstly characterized in that the step of admixing the garlic paste with egg yolk to form a garlic-egg yolk composite is carried out in such a manner that the temperature following the admixing of the garlic paste with the egg yolk is at least 400° C.

For an ordinary garlic-egg yolk mixture prepared as a home-made food, it is recommended that the garlic be mildly heated to form a paste and the addition of egg yolk thereto be made only after such pasty garlic is sufficiently cooled. However, in the production on a commercial scale envisined by the present invention, such an operation is not satisfactory for obtaining commercial products. On the contrary, egg yolk must be added to the garlic paste and admixed therewith while the garlic paste is kept at a relatively high temperature, thereby promoting sufficient chemical reactions between the garlic constituents and the egg yolk constituents. Thus, the strong smell of allysine will be concealed due to the chemical reaction of allysine with the egg yolk proteins, so that products can be obtained which are satisfactory to consumers.

The second characteristic feature of the process for producing the garlic-egg yolk composite food according to the present invention is that the raw garlic is steam-treated in advance to the step of heating and stirring. Surprisingly, this simple treatment dramatically reduces the smell from garlic in the subsequent steps, thereby mitigating the oppressive atmosphere otherwise experienced by the operators engaged in the mass production of the garlic-based food.

The third and possibly the most important characteristic feature of the process for producing the garlic-egg yolk composite food of the present invention resides in the heat-treatment of the garlic-egg yolk composite. Thus, according to the present invention, the heat-treatment is carried out by shaping the gelled garlic-egg yolk composite into a plate with a thickness of 4 to 6 mm, subjecting the plate to a natural drying and then irradiating the dried plate with far-infrared rays.

As described earlier, the most important step is that of heat-treating the gelled garlic-egg yolk composite which has been formed by admixing the garlic paste with egg yolk. This step promotes the complexation between garlic constituents and egg yolk constituents to synergistically enhance the efficacious functions of such constituents, particularly those of allysine in garlic and lecithin in egg yolk. Thus, a food product can be obtained with excellent fragrance and taste extracted from garlic. Careful attention must be paid in the heat-treatment to the fact that both garlic and egg yolk contain a high amount of oily components (lipids) and are easily susceptible to carbonization due to heating, resulting in loss of allysine and lecithin.

In fact, the heat-treatment of a garlic-egg yolk mixture in a pan or pot or a similar vessel as employed in home cooking or some commercial processes often produces black-colored carbonized products. This is probably because such a heating operation does not result in homogeneous heating but in local overheating. On the contrary, the present inventor has found that the carbonization of garlic and egg yolk constituents can be minimized by shaping the garlic-egg yolk composite in a gelled state into a thin plate with a thickness of 4 to 6 mm, subjecting the plate to a mild natural drying, and then irradiating the dried plate with far-infrared rays, particularly those having a wavelength of 2 $\mu$m to 20 $\mu$m, so that a product with moderate scorching can be obtained. It is considered that such far-infrared ray irradiation enables homongeous heating of the plate-shaped garlic-egg yolk composite even deep into the interior thereof.

The fourth characteristic feature of the process for producing the garlic-egg yolk composite food of the present invention is that the step of powdering the heat-treated garlic-egg yolk composite is carried out by pulverizing said heat-treated garlic-egg yolk composite with rollers made of hard alumina, i.e. alumina having a Mohs' hardness of 8.8 to 9.0. It is very difficult to pulverize garlic-egg yolk composite because of a high amount of oily components contained therein. For ease of pulverization, the conventional commercial processes employ overheating so as to fly out the oily components. Thus, such pulverization results in highly carbonized products, in which the efficacious functions of allysine and lecithin are substantially reduced.

The use of rollers of hard alumina, in accordance with the present invention, greatly facilitates the pulverization of the garlic-egg yolk composite even in the presence of a high amount of oily ingredients, thereby producing finely pulverized excellent composite food with a grain size of about 1/100 mm and preserving the allysine from garlic and the lecithin from egg yolk. While such finely pulverized garlic-egg yolk composites may be marketed as they are, they are conveniently charged into soft capsules at a high density in accordance with the present invention.

Thus, the present invention is further characterized in that the process for producing the garlic-egg yolk composite food includes the step of charging the powdered or granulated garlic-egg yolk composite into soft capsules. Preferably, the garlic-egg yolk composite is charged into soft capsules together with the addition of 45 to 55% by weight of safflower oil and 4 to 6% by weight of antioxidizing agent, based on the weight of said garlic-egg yolk composite. Capsules with a capacity of about 500 mg are generally used. Thus, about 225 to 275 mg of safflower oil and about 20 to 30 mg of antioxidizing agent are generally charged into each capsule.

In this step of capsulation, safflower oil serves as an emulsifying agent. It is necessary to mix as much garlic-egg yolk composite as possible into the emulsifying agent in order to obtain a highly efficacious capsuled food. Surprisingly, it has been found by the present inventor that the replacement of a part of the emulsifying agent with an antioxidizing agent can increase the amount of the garlic-egg yolk composite to be charged into capsules. In particular, if such capsulation is carried out following the fine pulverization with the alumina roller as described above, it is possible to dramatically increase the amount of the garlic-egg yolk composite to be charged into the capsules. Thus, according to the present invention there can be obtained capsuled food products containing the maximum amount of the heat-treated garlic-egg yolk composite without being damaged or denatured during the steps of pulverization and/or capsulation. Suitable antioxidizing agents include those comprising, as the preponderate component, an ester of a higher fatty acid and a higher alcohol and being acceptable as an additive in food. The present inventor has found that a particularly preferable antioxidant is beeswax containing myricyl palmitate as the preponderate component.

DESCRIPTION OF THE DRAWINGS

FIGS. 2a and 2b each illustrate the same device suitable for use in pulverizing garlic-egg yolk in accordance with the present invention.

DESCRIPTION OF THE PREFERRED EMBODIMENTS

Figure 1:
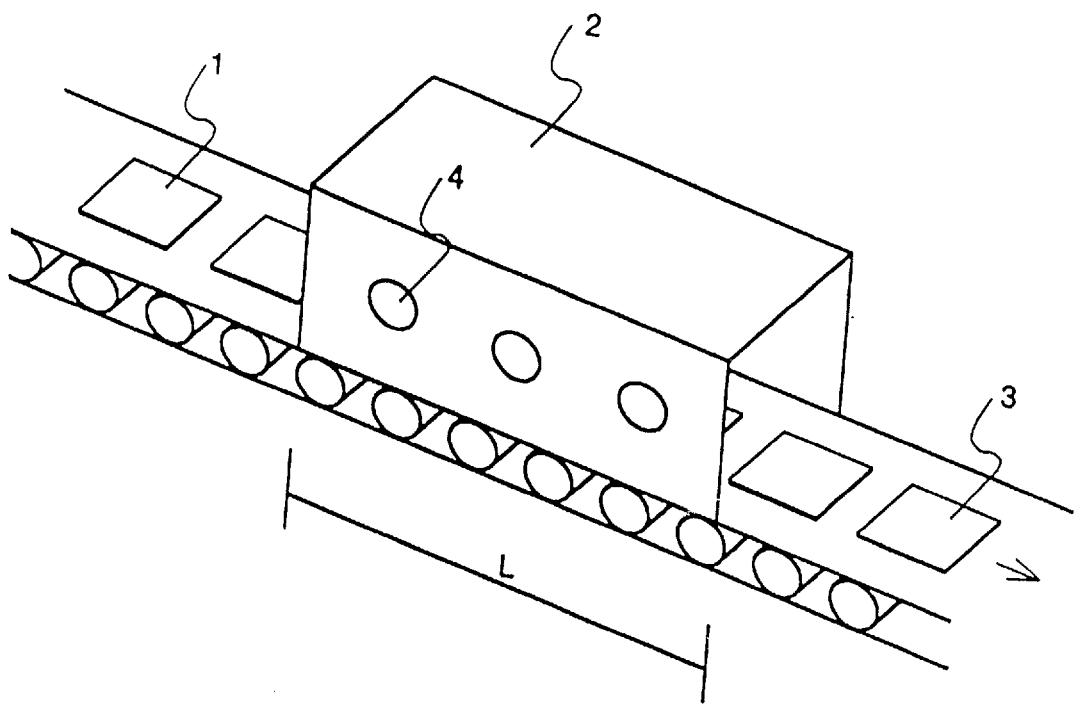
FIG. 1 illustrates an example of the apparatus for use in heat-treating garlic-egg yolk by irradiation with far-infrared rays in accordance with the present invention.

While the process of the present invention is generally started with fragmenting garlic bulbs as a raw material, in the preferred embodiment of the invention such garlic bulbs, as they are or in the form of relatively large chips, are subjected to a steam treatment in advance to the fragmentation. This treatment enables a marked reduction of the smell given off by the garlic in the subsequent steps. The steam-treatment is carried out by steaming garlic with water steam in a conventional steaming device, for about 30 minutes for raw garlic bulbs and for about 70 minutes for garlic chips.

The garlic is then pared, followed by the fragmentation of the pared garlic manually or with an appropriate fragmentation device, in which it is important to fragment the garlic into the smallest pieces possible. It is also preferred that the fragmented garlic be passed through a cloth filter or other filtering material to remove impurities such fibrous materials.

The garlic thus pretreated is then subjected to the step of heating and stirring. This treatment is carried out by gently stirring the garlic placed in a stainless steel vessel over a simmering-temperature flame manually or with an appropriate stirrer so as to slowly drive off the water contained in the garlic. Such heating and stirring for several hours results in a garlic paste similar to thick malt syrup.

The garlic paste thus formed is added to and admixed with egg yolk, preferably the yolk of fertilized chicken eggs. The ratio of garlic egg yolk is preferably in the range of 7:3 to 6:4 by weight. As described earlier, it is important in this step to admix the egg yolk with the garlic paste before the garlic paste completely cools, so that the temperature of the mixture of the two substances will be at least 40° C. More specifically, because the addition of egg yolk to the garlic paste results in a considerable temperature drop, where such temperature drop may of course depend upon the ratio of garlic and yolk, such addition must be done during the time when the garlic paste maintains a high temperature of 50° C. to 60° C., followed by a complete mixing of the two substances. The admixing step is carried out while keeping the temperature of at least 40° C., generally for 120 minutes to 150 minutes.

The step of admixing the garlic paste with egg yolk may be conducted batchwise with an appropriate container (e.g. a pan made of iron). However, in the case of a commercial process for mass production, it is preferred to carry out this step in a continuous mode, in which the garlic paste and the egg are pumped through respective transporting lines into a mixing machine.

The garlic-egg yolk thus prepared is then subjected to a heat-treatment to produce a composite food of the desired quality, wherein the heat-treatment is most preferably conducted by irradiating the garlic-egg yolk composite with far-infrared rays. FIG. 1 illustrates an apparatus for carrying out the heat-treatment of the garlic-egg yolk composite by irradiation with far-infrared rays.

Before being supplied to this heat-treatment apparatus, the gelled garlic-egg yolk composite is mildly pressed into the form of a plate with a thickness of 4 to 6 mm and then subjected to a natural drying. As can be seen from FIG. 1, the plate-shaped garlic-egg yolk composite is cut into pieces 1 (e.g. 20 cm×10 cm), which are consecutively passed through the far-infrared ray irradiation apparatus 2 by means of a belt-conveyor. The inside of the far-infrared ray irradiation apparatus 2 is kept at a substantially constant temperature (e.g. 130° to 140° C.) The garlic-egg yolk gel, with a thickness of 4 to 6 mm is homogeneously heated, from the surface to the core thereof, while being passed through the apparatus 2. Thus, heat-treated products 3 with a golden yellowish color and free of carbonization are consecutively fed out of the far-infrared irradiation apparatus.

It should be noted that, if the garlic-egg yolk composite gel is too thick (e.g. 10 mm), the homogeneous heating to the core cannot be achieved. On the other hand, there will occur overbaking resulting in highly carbonized products if the garlic-egg yolk gel is too thin. The conditions for a suitable heat-treatment depend upon the heating length (L) of the far-infrared irradiation apparatus and the load to be heat-treated. For example, if the garlic-egg yolk gel is to be treated at the rate of 40 to 50 kg/hr, the length (L) of the far-infrared irradiation apparatus is preferably about 5 m. Such passage through the far-infrared irradiation apparatus can be done repeatedly if required.

The far-infrared irradiation apparatus 2 generally has a monitoring window 4 and is equipped therein with a heating device for emitting far-infrared rays onto the garlic-egg yolk gel from the upper and lower parts of the apparatus. The far-infrared heater may, for example, be one in the form of a ceramic pipe or plate incorporating metallic heating element. Particularly suitable heaters which are commercially available include the electricity-powered far-infrared heaters made by Noritake Co.,such as the CHM (pipe-type), PLR (plate-type) and PLC (plate-type) models. While electricity-powered heaters are preferred because of ease of temperature control, heaters utilizing a gas or any other medium for heat supply can be used. Such ceramic heaters are used generally at a surface temperature of 300° to 400° C. so that infrared rays with a wavelength of 2 $\mu$m to 20 $\mu$m are radiated onto the garlic-egg yolk gel for suitable heat-treatment.

The heat-treated garlic-egg yolk composite is then subjected to a powdering or granulating step so as make it convenient for use and eating. While the powdering or granulation can be conducted by grinding or pelletizing the heat-treated composite manually or with a grinding or mixing machine, pulverization treatment with hard-alumina rollers is the most preferable. As described earlier, the garlic-egg yolk remains sticky even after the heat-treatment because of the high amount of oily components contained therein, making it difficult to pulverize with an ordinary rolling device as such oily substances stick to the rollers and will burn during the operation.

The use of rollers of hard alumina in accordance with the present invention solves such problem and enables the effective pulverization of the garlic-egg yolk composite. FIG. 2(a) generally illustrates a roller device suitable for practicing the present invention and FIG. 2(b) is a side cross-sectional view of part of such device showing the rollers in operation.

As shown in the figures, the roller device 5 has three rollers which are operated at circumferential velocities different from each other, for example, at circumferential velocities of rollers 6:7:8=1:2–3:4–8 . Thus, the coarsely ground garlic-egg yolk composite 9 is introduced into the nip between the rollers 6 and 7, conveyed while sticking to the circumference of roller 7 to pass through the nip between rollers 7 and 8, and then scraped by scraper 10. During this operation, the garlic-egg yolk composite does not fall off because of its stickiness and no burning of the oily substances as seen in the conventional grinding apparatus occurs. The roller device usable in the present invention may be composed of a pair of rollers operated at circumferential velocities different from each other (e.g. 1:2).

Thus, in accordance with the present invention there can be obtained finely pulverized garlic-egg yolk composite food. While such powdery garlic-egg yolk composite may be used a powder seasoning or a flavoring as it is, it can also be marketed as a product contained in soft-capsules.

Charging of the garlic-egg yolk composite into the capsules is carried out by injecting an emulsion of the composite in an emulsifying agent into the capsules with a needle or other injecting device. In accordance with the present invention it is possible to obtain a capsuled food in which an extremely high amount of the garlic-egg yolk composite is contained, for example, as high as 45%, by adding 50% by weight of safflower oil (e.g. available from Summit Oil Co.) and 5% by weight of beeswax as the antioxidizing agent (e.g. available from Miki Chemical Industry Co.: acid value 19.51, saponification value 94.28, ester value 74.77 and m.p. 63.1 ° C.) to the garlic-egg yolk which has been finely pulverized using the hard alumina rollers.

The garlic-egg yolk composite food thus produced by the process of the present invention is excellent as commercial food since it assumes a yellowish golden color, emits fragrance without offensive smell from garlic, and tastes good.

What is claimed is:

1. A process for producing a garlic-egg yolk composite food which comprises heating and stirring raw garlic for several hours to slowly drive off water from the garlic and prepare a garlic paste with a reduced water content, admixing the garlic paste with egg yolk to form a garlic-egg yolk composite in a gelled condition, heat-treating the gelled garlic-egg yolk composite, and powdering or granulating the heat-treated garlic egg-yolk composite, wherein during the step of admixing the garlic paste with egg yolk to form a garlic-egg yolk composite a temperature of at least 40° C. is maintained.

2. The process of claim 1 wherein the raw garlic is steam-treated in advance to the step of heating and stirring.

3. The process of claim 1 wherein the step of heat-treating the gelled garlic-egg yolk composite is carried out by shaping the gelled garlic-egg yolk composite into a plate with a thickness of 4 to 6 millimeters subjecting the plate to a natural drying and then irradiating the dried plate with far-infrared rays having a wavelength of about 2 to 20 $\mu$m.

4. The process of claim 1 wherein the step of powdering the heat-treated garlic-egg yolk composite is carried out by pulverizing said heat-treated garlic-egg yolk composite with rollers made of hard alumina.

5. The process of claim 1 which further comprises the step of charging the powdered or granulated garlic-egg yolk composite into soft capsules.

6. The process of claim 5 wherein the garlic-egg yolk composite is charged into soft capsules together with the addition of 45 to 55% by weight of safflower oil and 4 to 6% by weight of antioxidizing agent, based on the weight of said garlic-egg yolk composite.

7. The process of claim 2 wherein the step of heat-treating the gelled garlic-egg yolk composite is carried out by shaping the gelled garlic-egg yolk composite into a plate with a thickness of 4 to 6millimeters subjecting the plate to a natural drying and then irradiating the dried plate with far-infrared rays having a wavelength of about 2 to 20 $\mu$m.

8. The process of claim 3 wherein the step of powdering the heat-treated garlic-egg yolk composite is carried out by pulverizing said heat-treated garlic-egg yolk composite with rollers made of hard alumina.

9. The process of claim 2 wherein the step of powdering the heat-treated garlic-egg yolk composite is carried out by pulverizing said heat-treated garlic-egg yolk composite with rollers made of hard alumina.

10. The process of claim 7 wherein the step of powdering the heat-treated garlic-egg yolk composite is carried out by pulverizing said heat-treated garlic-egg yolk composite with rollers made of hard alumina.

11. The process of claim 4 wherein the garlic-egg yolk composite is charged into soft capsules together with an addition of 45 to 55% by weight of safflower oil and 4 to 6% by weight of antioxidizing agent, based on the weight of said garlic-egg yolk composite.

12. The process of claim 8 wherein the garlic-egg yolk composite is charged into soft capsules together with an addition of 45 to 55% by weight of safflower oil and 4 to 6% by weight of antioxidizing agent, based on the weight of said garlic-egg yolk composite.

13. The process of claim 10 wherein the garlic-egg yolk composite is charged into soft capsules together with the addition of 45 to 55% by weight of safflower oil and 4 to 6% of antioxidizing agent, based on the weight of said garlic-egg yolk composite.

14. A process for producing a garlic-egg yolk composite food comprising the steps of:

heat-treating raw garlic to reduce the odor thereof;

simmering the heat-treated raw garlic to slowly drive off water therefrom and prepare a garlic paste;

mixing the garlic paste with egg yolk to form a garlic-egg yolk gelled composite from the mixture;

maintaining the gelled garlic-egg yolk composite at a temperature of at least 40° C. during said step of mixing;

heat-treating the gelled garlic-egg yolk composite; and subsequently powdering or granulating the heat-treated gelled garlic-egg yolk composite.

15. The process of claim 14 wherein said step of heat-treating comprises the subsidiary step of shaping the gelled garlic-egg yolk composite into a plate with a thickness of about 4 to 6 millimeters.

16. The process of claim 15 wherein said step of heat-treating further comprises the subsidiary steps of:

naturally drying the plate; and subsequently irradiating the naturally dried plate with far-infrared rays having a wavelength of about 2–20$\mu$m.

17. The process of claim 16 wherein said step of subsequently irradiating the naturally dried plate comprises the subsidiary step of irradiating the naturally dried plate from opposed sides of the naturally dried plate.

18. The process of claim 14 further comprising the step of charging the powdered or granulated garlic-egg yolk composite into soft capsules together with an addition of about 45–55% by weight of safflower oil and about 4–6% by weight of an antioxidizing agent, based on the weight of said garlic-egg yolk composite.

* * * * *